United States Patent
Xu

(10) Patent No.: US 10,552,974 B2
(45) Date of Patent: Feb. 4, 2020

(54) ASSOCIATION METHODS AND ASSOCIATION DEVICES

(71) Applicant: Beijing Zhigu Rui Tuo Tech Co., Ltd, Beijing (CN)

(72) Inventor: Ran Xu, Beijing (CN)

(73) Assignee: Beijing Zhigu Rui Tuo Tech Co., Ltd, Beijing (CN)

(*) Notice: Subject to any disclaimer, the term of this patent is extended or adjusted under 35 U.S.C. 154(b) by 150 days.

(21) Appl. No.: 15/300,786

(22) PCT Filed: Mar. 12, 2015

(86) PCT No.: PCT/CN2015/074062
§ 371 (c)(1),
(2) Date: Sep. 30, 2016

(87) PCT Pub. No.: WO2015/149610
PCT Pub. Date: Oct. 8, 2015

(65) Prior Publication Data
US 2017/0024902 A1    Jan. 26, 2017

(30) Foreign Application Priority Data

Apr. 3, 2014  (CN) .......................... 2014 1 0133944

(51) Int. Cl.
*G06T 7/60*   (2017.01)
*G06Q 10/08*  (2012.01)
(Continued)

(52) U.S. Cl.
CPC ............... *G06T 7/60* (2013.01); *G06Q 10/08* (2013.01); *G06T 7/11* (2017.01); *H04N 5/225* (2013.01); *G06K 9/00691* (2013.01)

(58) Field of Classification Search
CPC ....................................................... G06T 7/60
See application file for complete search history.

(56) References Cited

U.S. PATENT DOCUMENTS 7,652,577 B1    1/2010  Madhow et al.
8,614,753 B2 *  12/2013 Ko ..................... H04N 1/00251
                                                    348/231.3
(Continued)

FOREIGN PATENT DOCUMENTS

CN    101340500 A    1/2009
CN    102200578 A    9/2011
(Continued)

OTHER PUBLICATIONS

International Search Report for PCT Application No. PCT/CN2015/074062, dated May 27, 2015, 4 pages.

*Primary Examiner* — Rowina J Cattungal
(74) *Attorney, Agent, or Firm* — Amin, Turocy & Watson, LLP

(57) ABSTRACT

This application provides an association method and device, and relates to the field of communications. The method comprises: obtaining image data in a visual field area of an imaging device; dividing the visual field area into multiple visual field subareas; obtaining first attribute information of an object in any one of the multiple visual field subareas by means of beam scanning; and establishing a correspondence between the first attribute information of the object in the visual field subarea and image data corresponding to the visual field subarea. By means of the association method and device, a high-accuracy correspondence between the object in the visual field area of the imaging device and the first attribute information of the object can be established, which is beneficial to presenting a user with the attribute information of the corresponding object in a more accurate and intuitive way.

24 Claims, 8 Drawing Sheets

(51) Int. Cl.
*G06T 7/11* (2017.01)
*H04N 5/225* (2006.01)
*G06K 9/00* (2006.01)

(56) References Cited

U.S. PATENT DOCUMENTS

| | | | | |
|---|---|---|---|---|
| 8,810,401 | B2* | 8/2014 | Karttaavi | G01S 13/74 |
| | | | | 235/375 |
| 2005/0280538 | A1* | 12/2005 | Kawai | G01S 3/74 |
| | | | | 340/572.1 |
| 2012/0007772 | A1* | 1/2012 | Parssinen | G06F 3/013 |
| | | | | 342/176 |
| 2013/0049925 | A1* | 2/2013 | Subramanian | G06K 7/10079 |
| | | | | 340/3.1 |
| 2013/0107057 | A1* | 5/2013 | Zhou | H04N 5/225 |
| | | | | 348/169 |
| 2014/0236980 | A1 | 8/2014 | Peng | |

FOREIGN PATENT DOCUMENTS

| | | |
|---|---|---|
| CN | 102356371 A | 2/2012 |
| CN | 103109244 A | 5/2013 |
| CN | 103440469 A | 12/2013 |
| CN | 103607536 A | 2/2014 |
| CN | 103927503 A | 7/2014 |
| JP | 4713715 B2 | 6/2011 |
| WO | 2011035256 A2 | 3/2011 |
| WO | 2013060269 A1 | 5/2013 |

* cited by examiner

| Visual field subarea | Sequence number of object | First attribute information | Display subarea |
|---|---|---|---|
| S11 | \ | \ | R11 |
| S12 | 222 | URL1 | R12 |
| S13 | \ | \ | R13 |
| S14 | \ | \ | R14 |
| S15 | \ | \ | R15 |
| S16 | \ | \ | R16 |
| S21 | \ | \ | R21 |
| S22 | \ | \ | R22 |
| S23 | \ | \ | R23 |
| S24 | \ | \ | R24 |
| S25 | 221 | Manufacturer a, Production Address b | R25 |
| S26 | \ | \ | R26 |
| S31 | \ | \ | R31 |
| S32 | \ | \ | R32 |
| S33 | \ | \ | R33 |
| S34 | \ | \ | R34 |
| S35 | \ | \ | R35 |
| S36 | \ | \ | R36 |

FIG. 5

ASSOCIATION METHODS AND ASSOCIATION DEVICES

RELATED APPLICATION

The present application is a U.S. National Stage filing under 35 U.S.C. § 371 of international patent cooperation treaty (PCT) application No. PCT/CN2015/074062, filed Mar. 12, 2015, and entitled "ASSOCIATION METHODS AND ASSOCIATION DEVICES", which claims the benefit of priority to Chinese Patent Application No. 201410133944.6, filed on Apr. 3, 2014, which applications are hereby incorporated into the present application by reference herein in their respective entireties.

TECHNICAL FIELD

This application relates to the field of communications technologies, and in particular to association methods and association devices.

BACKGROUND

With the development of electronic devices, photographing devices such as card cameras, single-lens reflex cameras and smartphones gradually get popular. These photographing devices can be conveniently used by people to take pictures, thus greatly enriching people's life.

At the same time, with the development of Internet of Things technologies, RFID (Radio Frequency Identification) tags have been increasingly applied to commodities. However, information in these RFID tags generally can only be read by a specialized RFID reader, and it is inconvenient for the RFID reader to intuitively present information in a tag to a user. Therefore, a camera having an RFID tag read function is proposed. As for this type of camera, when multiple objects having RFID tags exist in the visual field of the camera, the camera cannot establish an accurate correspondence between the objects and information in the RFID tags, thus affecting the user experience.

SUMMARY

An example, non-limiting objective of this application is to provide association methods and association devices.

According to an example aspect of at least one embodiment of this application, an association method is provided, where the method comprises:
  obtaining image data in a visual field area of an imaging device;
  dividing the visual field area into multiple visual field subareas;
  obtaining first attribute information of an object in any one of the multiple visual field subareas by means of beam scanning; and
  establishing a correspondence between the first attribute information of the object in the visual field subarea and image data corresponding to the visual field subarea.

According to another example aspect of at least one embodiment of this application, an association device is provided, where the association device comprises:
  an image data obtaining module, configured to obtain image data in a visual field area of an imaging device;
  a visual field area dividing module, configured to divide the visual field area into multiple visual field subareas;
  a first attribute information obtaining module, configured to obtain first attribute information of an object in any one of the multiple visual field subareas by means of beam scanning; and
  a correspondence establishing module, configured to establish a correspondence between the first attribute information of the object in the visual field subarea and image data corresponding to the visual field subarea.

According to at least one embodiment of this application, by means of the association methods and the association devices, a high-accuracy correspondence between the object in the visual field area of the imaging device and the first attribute information of the object can be established, which is beneficial to presenting a user with the attribute information of the corresponding object in a more accurate and intuitive way.

BRIEF DESCRIPTION OF THE DRAWINGS

The disclosure will become more fully understood from the detailed description given herein below for illustration only, and thus are not limitative of the disclosure, and wherein:

FIG. 5 is an example schematic diagram of a correspondence between first attribute information of an object in a visual field subarea and image data corresponding to the visual field subarea according to an embodiment of this application;

DETAILED DESCRIPTION

In the following, with reference to the accompanying drawings, the various embodiments of this application are further described in detail. The following embodiments are intended to illustrate this application, but not intended to limit the scope of this application.

Those skilled in the art should understand that, in the embodiments of this application, the sequence numbers of the following steps do not mean the order of the execution, and the order of execution of the steps is determined according to the functions and internal logic thereof, so the sequence numbers of the following steps should not have any restriction on the embodiments of this application.

Figure 1:
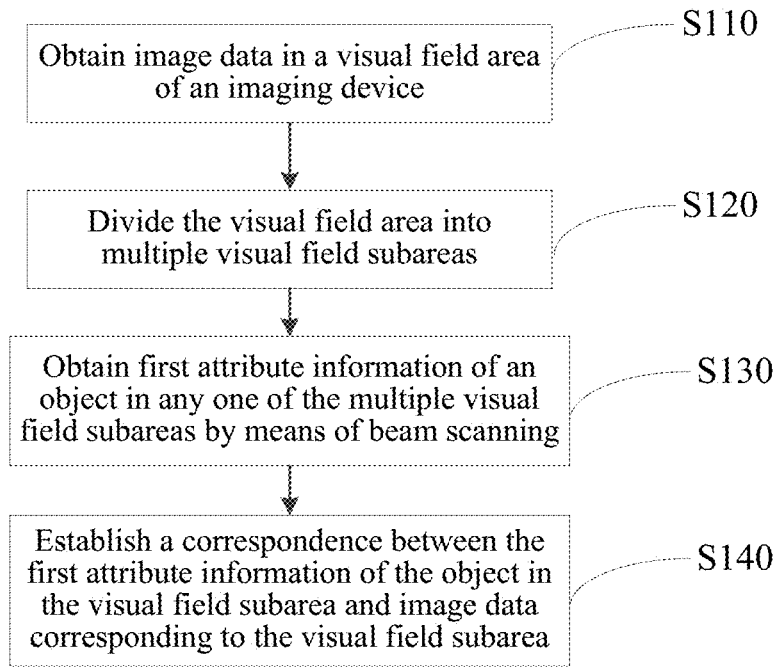
FIG. 1 is an example flowchart of an association method according to an embodiment of this application.

FIG. 1 is a flowchart of an association method according to an embodiment of this application, and the imaging method can be implemented on, for example, an association device. As shown in FIG. 1, the method comprises:

S110: Obtain image data in a visual field area of an imaging device.

S120: Divide the visual field area into multiple visual field subareas.

S130: Obtain first attribute information of an object in any one of the multiple visual field subareas by means of beam scanning.

S140: Establish a correspondence between the first attribute information of the object in the visual field subarea and image data corresponding to the visual field subarea.

According to the method of the embodiment of this application, in one aspect, the image data in the visual field area of the imaging device is obtained, and in another aspect, multiple visual field subareas are obtained by dividing the visual field area, the first attribute information of an object in any visual field subarea is obtained by performing beam scanning on the visual field subarea, and then the correspondence between the attribute information of the object in the visual field subarea and image data corresponding to the visual field subarea is established, so that the first attribute information of the object is correspondingly obtained while the image data of the object is obtained, and the correspondence between them has a high accuracy.

The functions of steps S110, S120, S130 and S140 are described below in detail with reference to various embodiments.

S110: Obtain image data in a visual field area of an imaging device.

Figure 2:
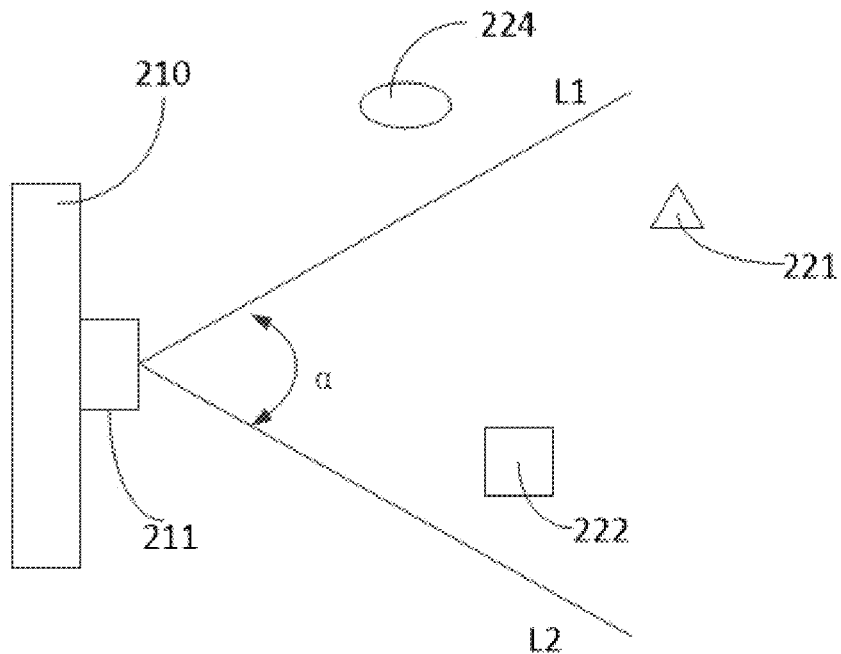
FIG. 2 is an example schematic cross-sectional diagram of a visual field area according to an embodiment of this application.

The imaging device may comprise, for example, a camera and a CCD (Charge-coupled Device). The imaging device may be comprised in the association device, or may be disposed independent of the association device. The visual field area may be generally determined according to a visual field parameter of the imaging device such as a focal length or a visual angle. FIG. 2 is a schematic cross-sectional diagram of the visual field area. The imaging device 210 comprises a camera 211. When a visual angle of the camera 211 is a, correspondingly L1 may represent the upper boundary of the visual field area, and L2 may represent the lower boundary of the visual field area. Additionally, FIG. 2 is a schematic cross-sectional diagram obtained by cross-cutting the visual field area by using a vertical plane comprising the central axis of the camera, and those skilled in the art should understand that, the space structure of the visual field area is a three-dimensional structure similar to a cone shape. In FIG. 2, a first object 221, a second object 222 and a third object 223 are located in the visual field area, and a fourth object 224 is located outside the visual field area. Additionally, those skilled in the art should understand that, the visual field area can also be determined according to the focal length of the imaging device, which is not described herein again.

The obtained image data may be a picture or video obtained by the imaging device by means of photographing, and may also be an image presented on the display screen of the imaging device before obtaining the picture or video.

S120: Divide the visual field area into multiple visual field subareas.

Figure 3:
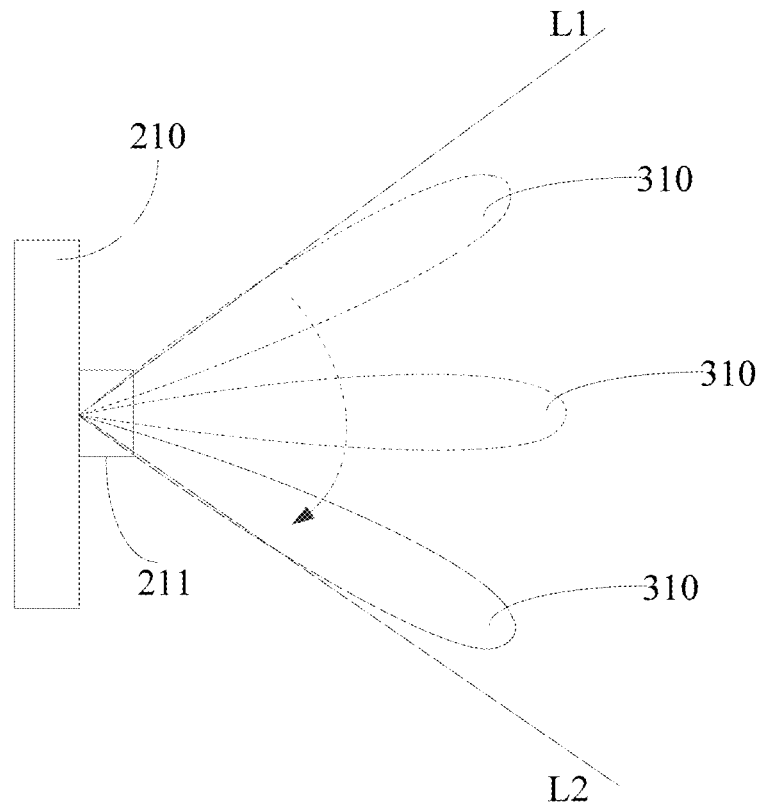
FIG. 3 is an example schematic diagram of visual field subareas obtained by means of division according to an embodiment of this application.

As shown in FIG. 3, the visual field area (the area between L1 and L2 in FIG. 3) may be divided into multiple visual field subareas 310, and each of the visual field subareas 310 is also cone-shaped in general. Those skilled in the art should understand that, image data corresponding to each visual field subarea 310 is a part of the data of the image in the visual field area. Additionally, in order to enable the visual field subarea 310 to cover the visual field area well, that is, in order to enable the beam to completely scan the entire visual field area hereinafter, in one aspect, different visual field subareas 310 may have an overlapping area, and in another aspect, the visual field area should be divided as finely as possible, because as for a given visual field area, the greater the number of the visual field subareas 310 obtained by means of division is, the better the coverage effect thereof is. Therefore, the number of the visual field subareas 310 at least is two, and moreover, in order to avoid missing in scanning, the number of the visual field subareas 310 should be as great as possible.

S130: Obtain first attribute information of an object in any one of the multiple visual field subareas by means of beam scanning.

In an example embodiment, step S130 specifically comprises:

S131: Scan the visual field subarea by using a directional beam.

S132: Receive the first attribute information fed back by the object in the visual field subarea according to the scanning of the directional beam.

In step S131, the directional beam may be formed by means of a beam forming technology. Beam forming is a combination of an antenna technology and a digital signal processing technology, and is aimed at transmitting or receiving a directional signal. In an example embodiment, the visual field subareas may be sequentially scanned by using a directional beam. As shown in FIG. 3, the visual field subareas 310 may be sequentially scanned from top to bottom along the direction of an arrow. In another example embodiment, multiple directional beams may be controlled to scan multiple visual field subareas simultaneously.

Additionally, the coverage area (that is, the area covered by single scanning of a single directional beam) of the directional beam corresponds to the visual field subarea. Therefore, in order to ensure that the entire visual field area has a good scanning coverage effect, the area covered by the single scanning of the directional beam should be as small as possible, which can be achieved by increasing the number of transmitting antennas of the directional beam.

In step S132, the first attribute information fed back by the object in the visual field subarea according to the scanning of the directional beam may be received by means of a wireless network. The object in the visual field subarea refers to an object partially or totally located in the visual field subarea, and in other words, at least one part of the object is located in the visual field subarea.

In an example embodiment, the wireless network comprises at least one of a Wi-Fi (wireless fidelity) network, a Bluetooth network, a Zigbee network, a WiBro (Wireless Broadband) network and a cellular network, and a communications module is disposed on the object, and correspondingly, the communications module receives the directional beam, and sends the first attribute information of the object stored in the communications module to the association device. In this case, an object in a visual field subarea refers to an object of which a communications module is located in the visual field subarea. At the same time, in this case, the first attribute information may be relevant information such as the name, the code, the production address and the production date of the object.

In an example embodiment, the wireless network is an RFID network, and an RFID electronic tag is disposed on the object; correspondingly, the RFID electronic tag receives the directional beam, and sends the first attribute information of the object stored in the RFID electronic tag to the association device. In this case, an object in a visual field subarea refers to an object of which an RFID electronic tag is located in the visual field subarea. At the same time, in this case, the first attribute information is generally address information corresponding to the object, and according to the address information, the association device can perform a query to obtain more detailed information of the object, that is, second attribute information.

S140: Establish a correspondence between the first attribute information of the object in the visual field subarea and image data corresponding to the visual field subarea.

Taking the situation that the wireless network is an RFID network as an example, the RFID electronic tag may be an active electronic tag, may also be a passive electronic tag, and have a small size generally in millimeter. Therefore, in the case that the coverage area of the directional beam is sufficiently small, the tag can be scanned and the first attribute information can be received in a sufficiently small visual field subarea, while when scanning is preformed outside the visual field subarea, the first attribute information is not received, so that the first attribute information of the object in the visual field subarea can be accurately associated with the visual field subarea. Additionally, the visual field subarea corresponds to a part of the image data, thus obtaining the correspondence between the first attribute information of the object in the visual field subarea and the image data corresponding to the visual field subarea.

Generally, the volume of the object is much larger than that of the tag. Assuming that the cross-sectional area of the visual field subarea in the direction perpendicular to the scanning direction is slightly larger than the cross-sectional area of the tag, the image data corresponding to the visual field subarea is a part of the image data of the object. According to the correspondence between the first attribute information of the object in visual field subarea and the image data corresponding to the visual field subarea, the correspondence between the image data of the object and the first attribute information of the object can be indirectly obtained. Furthermore, compared with establishing the correspondence between the image data of the object and the attribute information of the object by using a GPS positioning technology, the method of this application does not have the problem of poor GPS positioning accuracy, thus having a higher accuracy; compared with establishing the correspondence between the image data of the object and the attribute information of the object by calculating the focusing position, since the volume of the tag is much smaller than that of the object, the error range of this application generally does not exceed the range of the image data of the object, thus having a higher accuracy.

Figure 4:
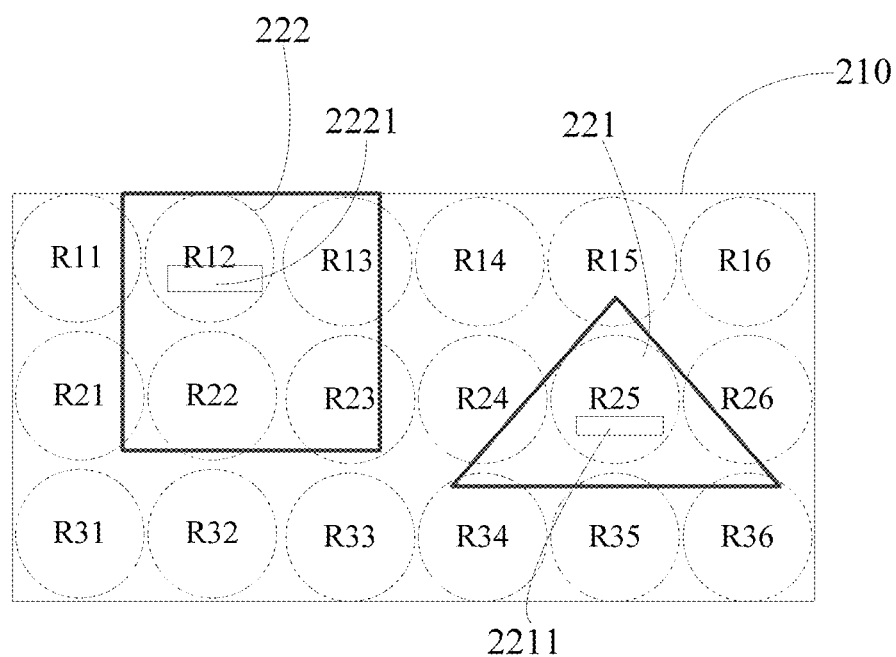
FIG. 4 is an example schematic diagram of display subareas according to an embodiment of this application.

Referring to FIG. 4, corresponding to the visual field subarea, the display screen of the imaging device 210 may be divided into multiple display subareas, and as shown in FIG. 4, the display screen is divided into 18 display subareas of R11 to R36. It is assumed that the sequence numbers of 18 visual field subareas respectively corresponding to the 18 display subareas are S11 to S36 (not shown), and moreover, and it is assumed that an RFID electronic tag (or communications module) 2211 of the first object 221 is located in the visual field subarea S25, an RFID electronic tag (or communications module) 2221 of the second object 222 is located in the visual field subarea S12. At the same time, it can be seen from FIG. 4 that, the image data of the first object 221 covers the image data in the display subarea R25; the image data of the second object 222 covers the image data in the display subarea R12. For simplicity, the display subareas in FIG. 4 are all represented by perfect circles, but those skilled in the art should understand that, the display subareas at edges of the display screen should be ellipses having a ratio of major axis to minor axis being greater than 1; the display subareas at the center position of the display screen are perfect circles having a ratio of major axis to minor axis being 1, and the ratios of major axis to minor axis of the ellipses corresponding to the display subareas from the edges of the display screen to the center of the display screen gradually decrease, that is, gradually approach 1.

Specifically, the correspondence may be as shown in FIG. 5. The record in the eleventh row in FIG. 5 represents that the RFID tag 2211 of the first object 221 is located in the visual field subarea S25, the first attribute information of the first object 221 is "Manufacturer a, Production Address b", and the visual field subarea S25 corresponds to the display subarea R25, so that the correspondence between the first attribute information of "Manufacturer a, Production Address b" of the first object 221 and the image data in the display subarea R25 can be obtained. Similarly, the correspondence between the first attribute information of "URL1" of the second object 222 and the image data in the display subarea R12 can be obtained.

Figure 6:
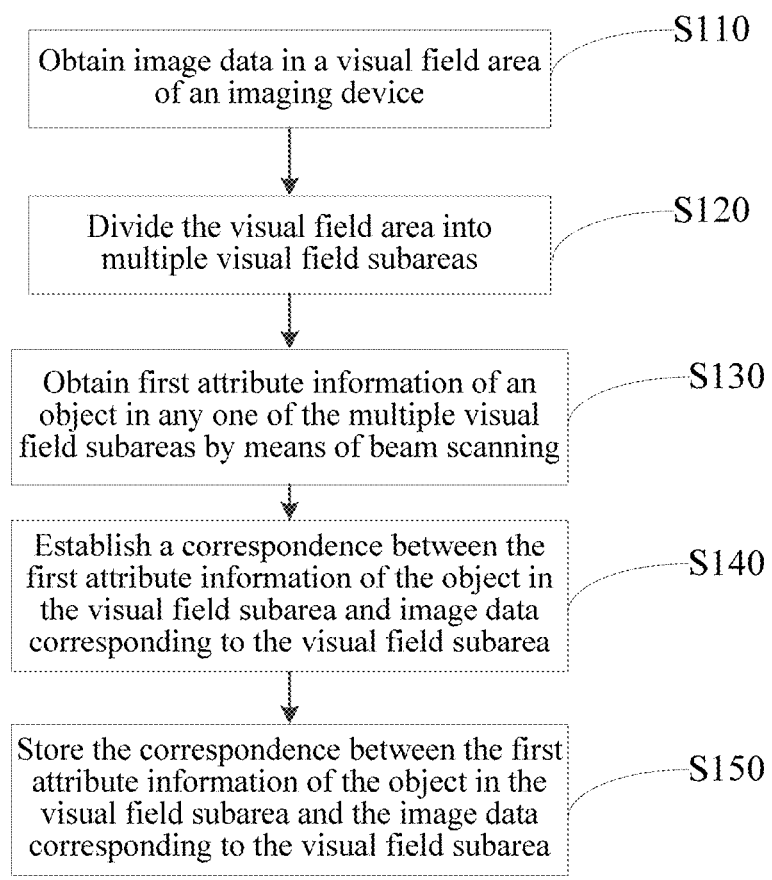
FIG. 6 is an example flowchart of an association method according to an implementation manner of this application.

Referring to FIG. 6, in an example embodiment of this application, the method may further comprise:

S150: Store the correspondence between the first attribute information of the object in the visual field subarea and the image data corresponding to the visual field subarea.

By storing the correspondence, the first attribute information of the object in the visual field subarea can be output to a user based on the correspondence according to requirements. For example, when the user clicks image data corresponding to a target object, the first attribute information of the object in the visual field subarea where the electronic tag on the object is located (that is, the first attribute information of the given target object) is output to the user by means of the method.

Figure 7:
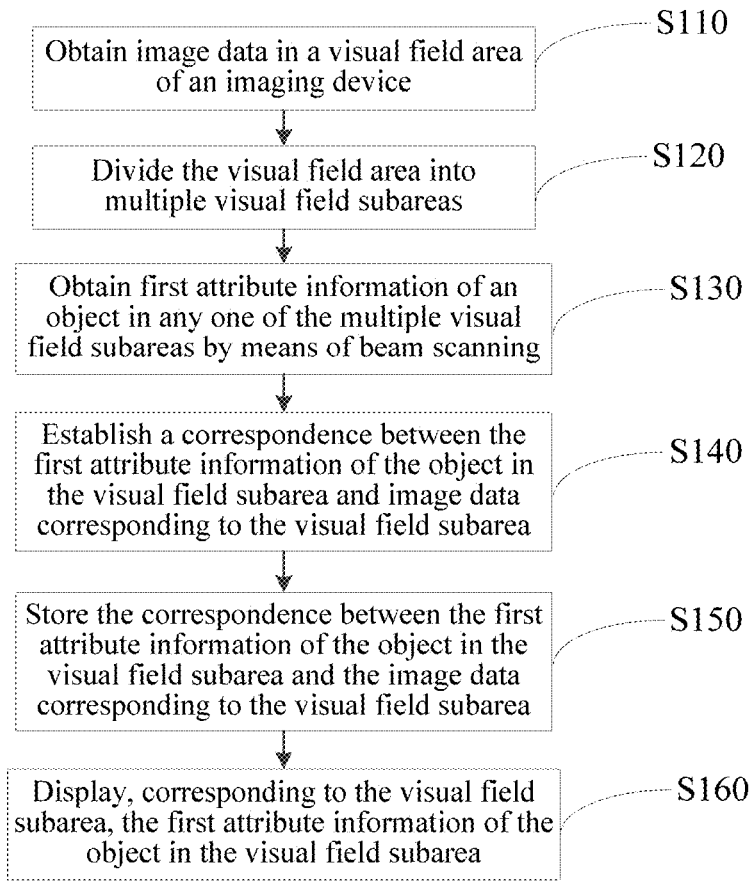
FIG. 7 is an example flowchart of an association method according to another implementation manner of this application.

Referring to FIG. 7, in an example embodiment of this application, in order to make it convenient for the user to intuitively understand the first attribute information of the object in the visual field subarea, the method may further comprise:

S160: Display, corresponding to the visual field subarea, the first attribute information of the object in the visual field subarea.

Figure 8:
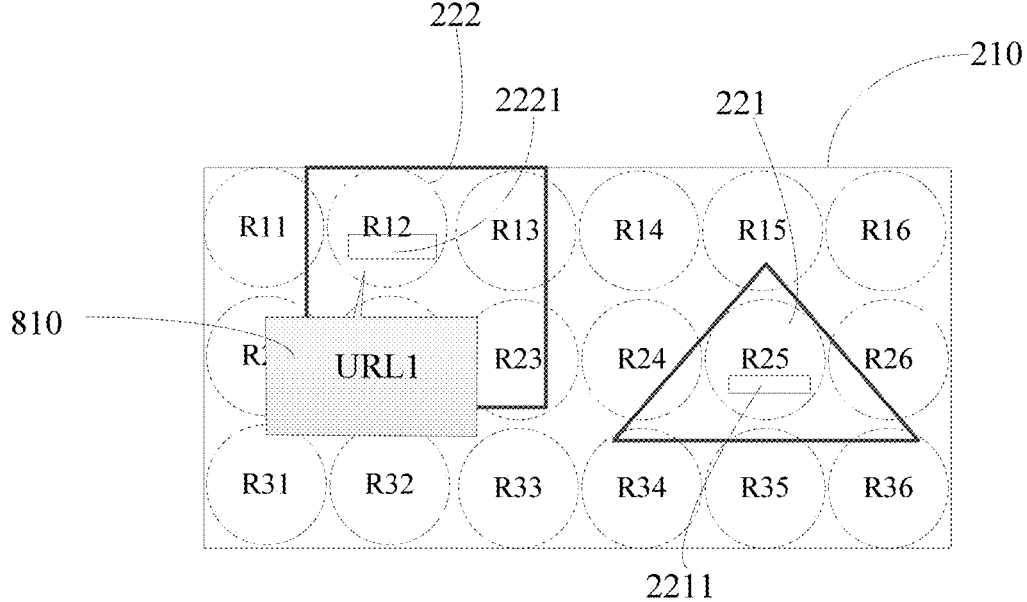
FIG. 8 is an example schematic diagram of first attribute information of a displayed object according to this application.

As shown in FIG. 8, when the user inputs an instruction and wants to check the first attribute information of the second object 222, the user can long-press the image data of the second object 222, the imaging device can elicit a dialog box 810 from the display subarea R12 corresponding to the visual field subarea and display the first attribute information of the second object 222 in the dialog box 810.

Certainly, the association device may also display the first attribute information of the object in the visual field subarea in a default state, that is, display the first attribute information of the object in the visual field subarea automatically, corresponding to each of the visual field subareas. For example, when being in a view-finding state before photographing or video recording, the imaging device displays, corresponding to each of the visual field subareas, the first attribute information of the object in the visual field subarea on the display screen.

Figure 9:
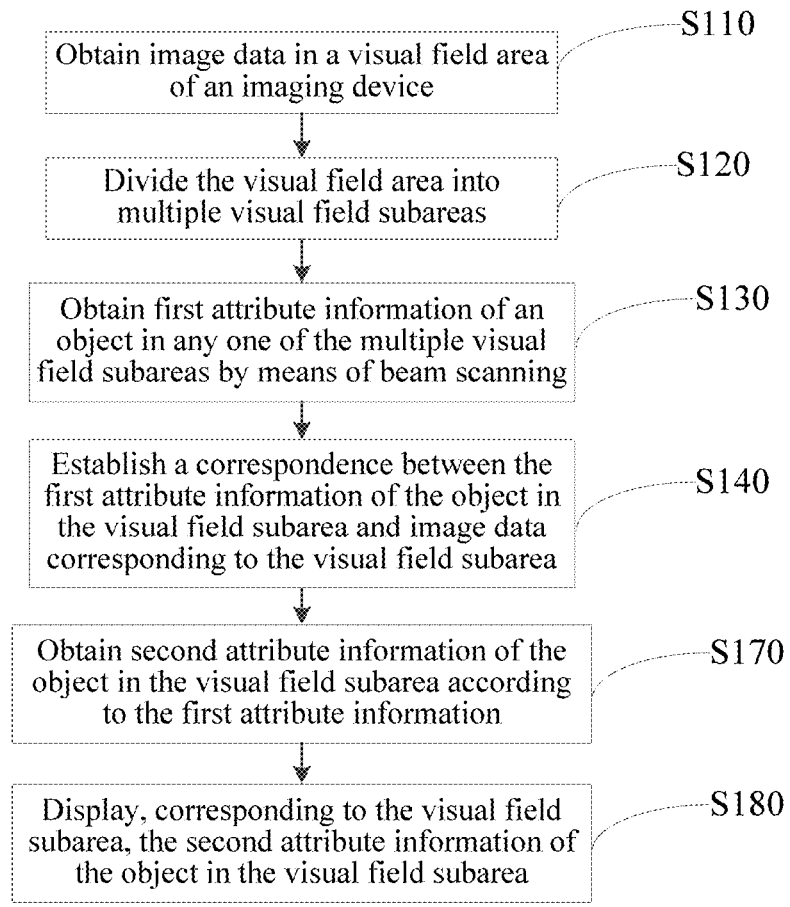
FIG. 9 is an example flowchart of an association method according to another implementation manner of this application.

Additionally, the first attribute information may merely correspond to index information of the object, and the association device can query a local memory or a network server according to the index information, so as to further obtain the second attribute information of the object, that is, the detailed information of the object. For example, when the association device obtains the first attribute information of the object by reading the RFID electronic tag on the object, the first attribute information is generally address information (such as URL (Uniform Resource Locator) address) corresponding to the object, and the association device may query the network server according to the address information, so as to further obtain the second attribute information of the object, and display, corresponding to the visual field subarea, the second attribute information of the object in the visual field subarea. Therefore, referring to FIG. 9, in an example embodiment of this application, the method may further comprise:

S170: Obtain second attribute information of the object in the visual field subarea according to the first attribute information.

S180: Display, corresponding to the visual field subarea, the second attribute information of the object in the visual field subarea.

Additionally, a computer readable medium is further provided in an embodiment of this application, comprising computer readable instructions performing the following operations when being executed: executing operations of steps S110 to S180 of the methods in the example embodiments shown in FIG. 1, FIG. 6, FIG. 7 and FIG. 9.

In view of the above, in the association methods of the example embodiments of this application, the first attribute information of the object in each visual field subarea of the imaging device can be obtained by means of directional beam scanning, moreover, the corresponding second attribute information can be further obtained according to the first attribute information, and the first attribute information or second attribute information of the object in the visual field subarea can be displayed, corresponding to the visual field subarea, on the display screen of the imaging device, so as to enable the user to conveniently and intuitively understand the attribute information of the object.

Figure 10:
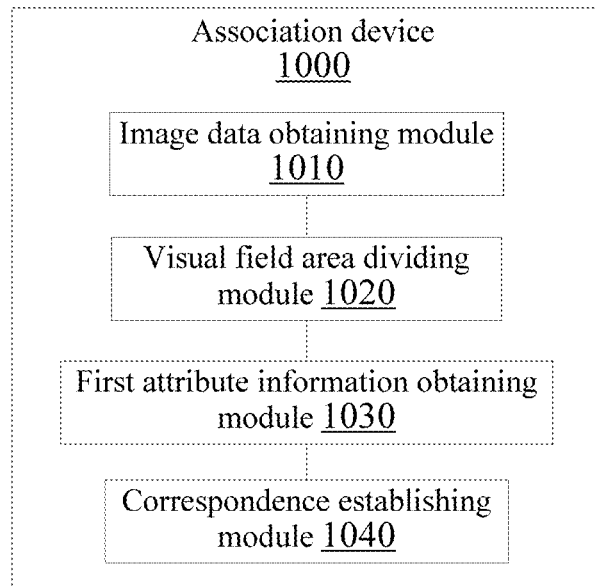
FIG. 10 is an example schematic structural diagram of modules of an association device according to an embodiment of this application.

FIG. 10 is a schematic structural diagram of modules of an association device according to an embodiment of this application. The association device may comprise an imaging device, or is disposed independent of an imaging device. The association device may be a smartphone with a camera, a card camera and an single-lens reflex camera, and may also be a pair of smart glasses or other devices.

As shown in FIG. 10, the association device 1000 comprises:

an image data obtaining module 1010, configured to obtain image data in a visual field area of an imaging device;

a visual field area dividing module 1020, configured to divide the visual field area into multiple visual field subareas;

a first attribute information obtaining module 1030, configured to obtain first attribute information of an object in any one of the multiple visual field subareas by means of beam scanning; and a correspondence establishing module 1040, configured to establish a correspondence between the first attribute information of the object in the visual field subarea and image data corresponding to the visual field subarea.

According to the association device according to the embodiment of this application, in one aspect, the image data in the visual field area of the imaging device is obtained, and in another aspect, multiple visual field subareas are obtained by dividing the visual field area, first attribute information of an object in a visual field subarea is obtained by performing beam scanning on the visual field subarea, and then the correspondence between the attribute information of the object in the visual field subarea and image data corresponding to the visual field subarea is established, so that the first attribute information of the object is correspondingly obtained while the image data of the object is obtained, and the correspondence between them has a high accuracy.

Functions of the image data obtaining module 1010, the visual field area dividing module 1020, the first attribute information obtaining module 1030 and the correspondence establishing module 1040 are described below in detail with reference to example embodiments.

The image data obtaining module 1010 is configured to obtain image data in a visual field area of an imaging device.

The imaging device may comprise, for example, a camera and a CCD. The visual field area generally may be determined according to a visual field parameter such as a focal length or visual angle of the imaging device. The schematic cross-sectional diagram of the visual field area is as shown in FIG. 2, which is not described herein again.

The obtained image data may be a picture or video obtained by the imaging device by means of photographing, and may also be an image presented on the display screen of the imaging device before obtaining the picture or video.

The visual field area dividing module 1020 is configured to divide the visual field area into multiple visual field subareas.

The cross-sectional diagram of the visual field subarea is as shown in FIG. 3, and those skilled in the art should understand that, image data corresponding to each visual field subarea is a part of the image data in the visual field area. Additionally, in order to enable the visual field subarea to cover the visual field area well, that is, in order to enable the beam to completely scan the entire visual field area hereinafter, in one aspect, different visual field subareas 310 may have an overlapping area, and in another aspect, the visual field area should be divided into visual field subareas the number of which is as large as possible.

The first attribute information obtaining module 1030 is configured to obtain the first attribute information of the object in the visual field subarea by means of beam scanning.

Figure 11:
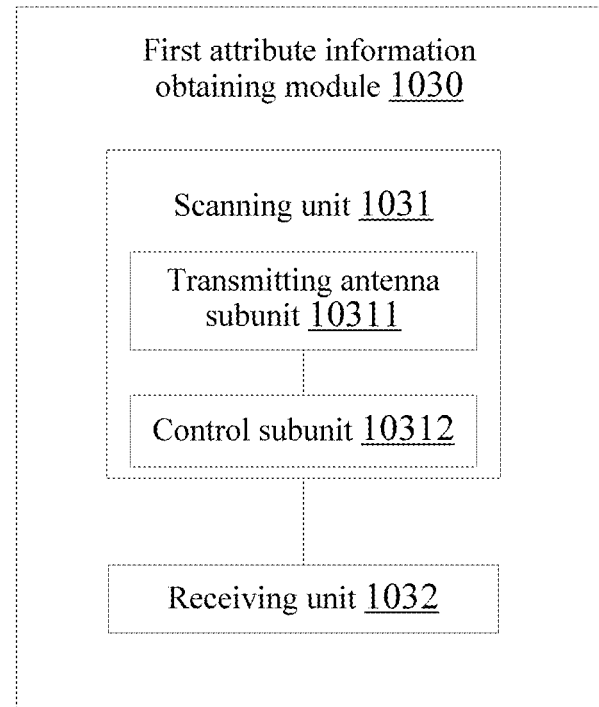
FIG. 11 is an example schematic diagram of a module structure of a first attribute information obtaining module according to an implementation manner of this application.

Referring to FIG. 11, in an example embodiment, the first attribute information obtaining module 1030 may comprise:

a scanning unit 1031, configured to scan the visual field subarea by using a directional beam; and a receiving unit 1032, configured to receive the first attribute information fed back by the object in the visual field subarea according to the scanning of the directional beam.

The scanning unit 1031 may comprise:
- a transmitting antenna subunit 10311, configured to form the directional beam, where the transmitting antenna subunit 10311 may comprise a switched-beam antenna, a phased-array antenna and a smart antenna; and
- a control subunit 10312, configured to control the directional beam to scan the visual field subarea.

The coverage area (that is, the area covered by single scanning of a single directional beam) of the directional beam corresponds to the visual field subarea. Therefore, in order to ensure that the entire visual field area has a good scanning coverage effect, the area covered by the single scanning of the directional beam should be as small as possible, which can be achieved by increasing the number of transmitting antennas in the transmitting antenna subunit 10311.

In an example embodiment, the receiving unit 1032 is configured to receive, by means of a wireless network, the first attribute information fed back by the object in the visual field subarea according to the scanning of the directional beam.

In an example embodiment, the wireless network may comprise at least one of a Wi-Fi network, a Bluetooth network, a Zigbee network, a WiBro network and a cellular network, and a communications module is disposed on the object, and correspondingly, the communications module receives the directional beam, and sends the first attribute information of the object stored in the communications module to the association device. In this case, the first attribute information may be relevant information such as the name, the code, the production address and the production date of the object.

In an example embodiment, the wireless network is an RFID network, and an RFID electronic tag is disposed on the object; correspondingly, the RFID electronic tag receives the directional beam, and sends the first attribute information of the object stored in the RFID electronic tag to the association device. In this case, the first attribute information is generally address information corresponding to the object, and according to the address information, the association device can perform a query to obtain more detailed information of the object, that is, second attribute information. At this time, the first attribute information obtaining module 1030 may comprise an RFID reader.

The correspondence establishing module 1040 is configured to establish a correspondence between the first attribute information of the object in the visual field subarea and image data corresponding to the visual field subarea.

The correspondence between first attribute information of an object in the visual field subarea and image data corresponding to the visual field subarea may be as shown in FIG. 5. Based on this correspondence, the user can understand the attribute information of the object in the visual field area more conveniently and intuitively.

Figure 12:
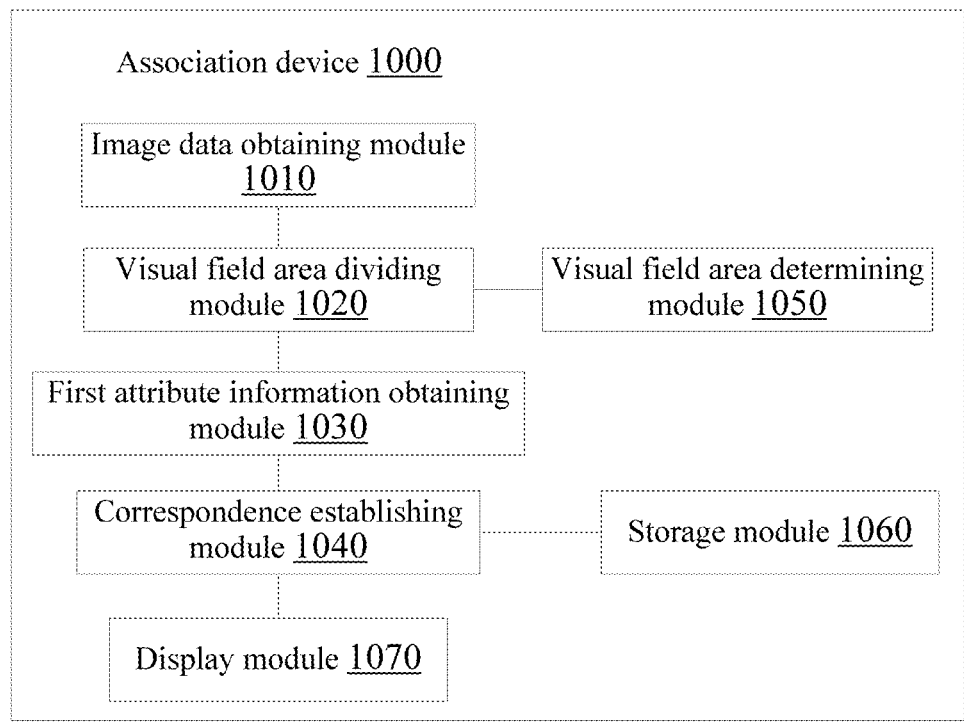
FIG. 12 is an example schematic structural diagram of modules of an association device according to an implementation manner of this application.

Referring to FIG. 12, in an example embodiment, the association device 1000 further comprises:
- a visual field area determining module 1050, configured to determine the visual field area according to a visual field parameter of the imaging device, where the visual field parameter may be a visual angle, a focal length or the like.

Similarly, referring to FIG. 12, in an example embodiment, the association device 1000 further comprises:
- a storage module 1060, configured to store the correspondence between the first attribute information of the object in the visual field subarea and the image data corresponding to the visual field subarea; and
- a display module 1070, configured to display, corresponding to the visual field subarea, the first attribute information of the object in the visual field subarea.

In this example embodiment, the first attribute information of the object in the visual field subarea can be output to the user based on the correspondence according to requirements. For example, when the user clicks image data corresponding to a target object, the first attribute information of the object in the visual field subarea where the electronic tag on the object is located (that is, the first attribute information of the given target object) is output to the user by means of the method, so as to make it convenient for the user to intuitively understand the first attribute information of the object in the visual field area.

Figure 13:
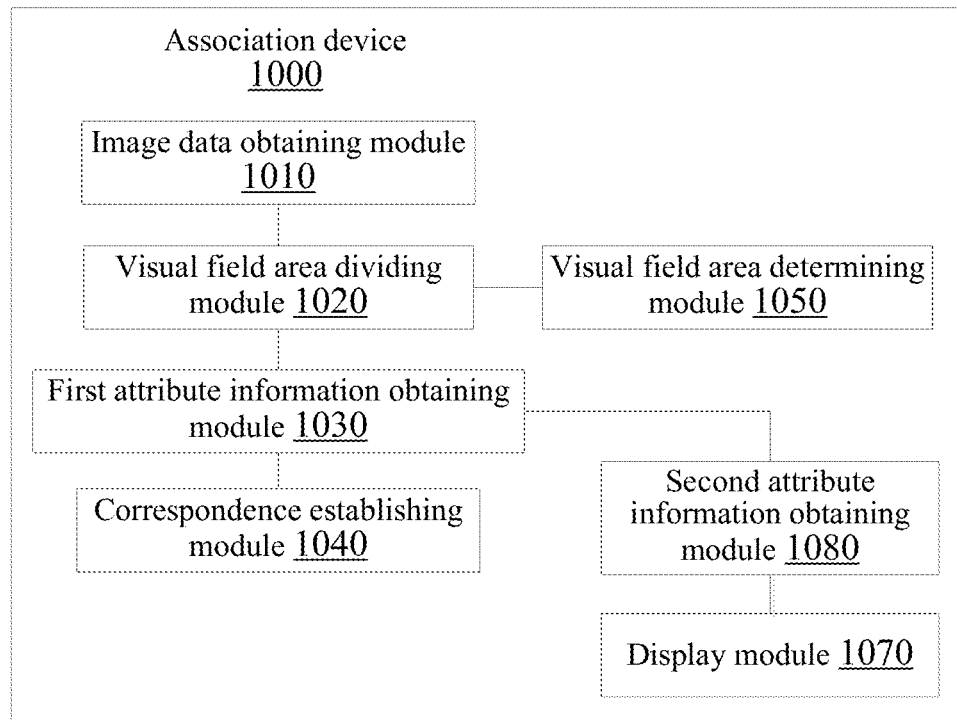
FIG. 13 is an example schematic structural diagram of modules of an association device according to another implementation manner of this application.

Additionally, the first attribute information may merely correspond to index information of the object, and the association device can query a local memory or a network server according to the index information, so as to further obtain the second attribute information of the object, that is, the detailed information of the object. For example, when the association device obtains the first attribute information of the object by reading the RFID electronic tag on the object, the first attribute information is generally address information (such as URL address) corresponding to the object, and the association device may query the network server according to the address information, so as to further obtain the second attribute information of the object, and display, corresponding to the visual field subarea, the second attribute information of the object in the visual field subarea. Therefore, referring to FIG. 13, in another example embodiment, the association device 1000 further comprises:
- a second attribute information obtaining module 1080, configured to obtain second attribute information of the object in the visual field subarea according to the first attribute information; and
- a display module 1070, configured to display, corresponding to the visual field subarea, the second attribute information of the object in the visual field subarea.

Figure 14:
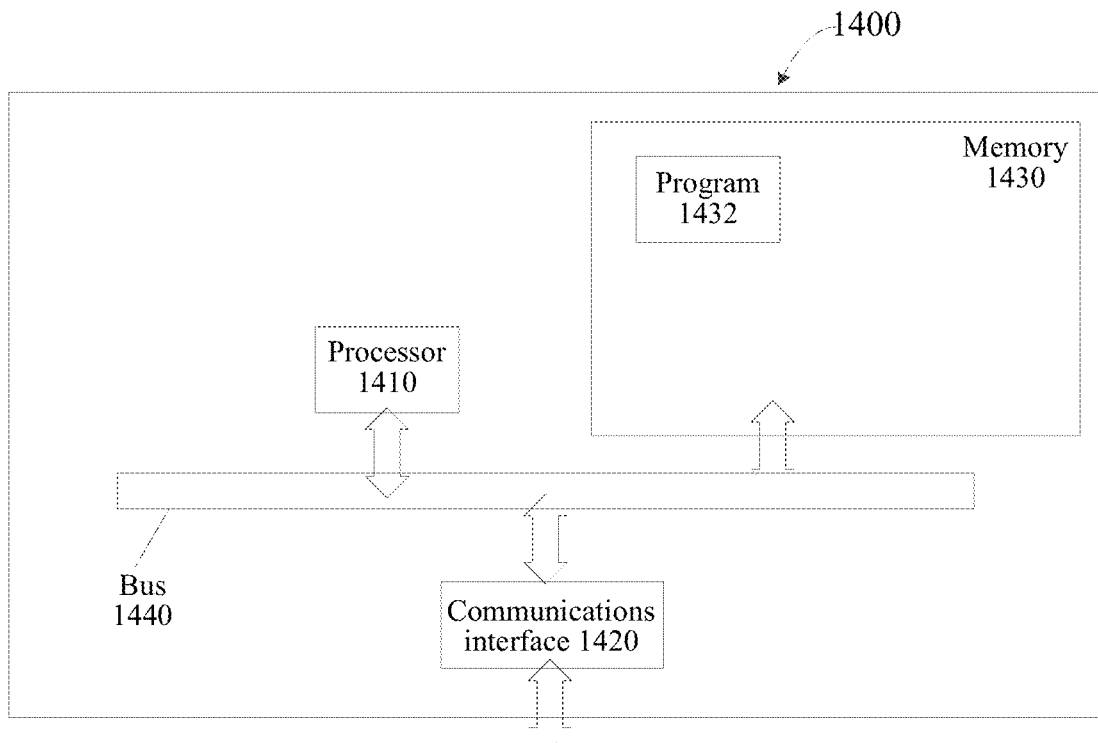
FIG. 14 is an example schematic structural diagram of hardware of an association device according to an embodiment of this application.

The hardware structure of an association device according to an embodiment of this application is as shown in FIG. 14. The specific embodiments of this application do not limit the specific implementation of the association device, and referring to FIG. 14, the association device 1400 may comprise:
- a processor 1410, a communications interface 1420, a memory 1430 and a communications bus 1440.

The processor 1410, the communications interface 1420 and the memory 1430 communicate with each other by means of the communications bus 1440.

The communications interface 1420 is configured to communicate with other network elements.

The processor 1410 is configured to execute a program 1432, and may specifically execute relevant steps in the method embodiment shown in FIG. 1.

Specifically, the program 1432 may comprise a program code, and the program code comprises a computer operating instruction.

The processor 1410 may be a central processing unit CPU, or an ASIC (Application Specific Integrated Circuit), or one or more integrated circuits configured to implement the embodiments of this application.

The memory 1430 is configured to store the program 1432. The memory 1430 may comprise a high-speed RAM memory, and may also comprise a non-volatile memory, for example, at least one magnetic disk memory. The program 1432 specifically may execute the following steps:
- obtaining image data in a visual field area of an imaging device;

dividing the visual field area into multiple visual field subareas;

obtaining first attribute information of an object in any one of the multiple visual field subareas by means of beam scanning; and establishing a correspondence between the first attribute information of the object in the visual field subarea and image data corresponding to the visual field subarea.

For specific implementation of steps in the program 1432, reference may be made to related steps or modules in the foregoing embodiment, which is not described here. It can be clearly understood by persons skilled in the art that, for the purpose of convenient and brief description, as for a specific working process of the foregoing device and module, reference can be made to the corresponding process in the foregoing method embodiments, and the details are not described herein again.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the functions are implemented in a form of a software functional unit and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a controller, a network device, and the like) to perform all or a part of the steps of the method described in the embodiment of this application. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing example embodiments are merely intended for describing this application rather than limiting this application. A person of ordinary skill in the art should understand that modifications and variations may still be made without departing from the spirit and scope of this application. Therefore, all equivalent technical solutions shall fall within the scope of this application, and the patent protection scope of this application shall be subject to the claims.

What is claimed is:

1. A method, comprising:
   obtaining, by an imaging device comprising a processor, image data in a visual field area of the imaging device;
   dividing the visual field area into multiple visual field subareas, wherein each of the multiple visual field subareas is cone-shaped;
   obtaining first attribute information of an object in any one of the multiple visual field subareas by beam scanning; and
   establishing a correspondence between the first attribute information of the object and image data corresponding to a visual field subarea of the multiple visual field subareas in which the object is located, wherein the image data corresponding to the visual field subarea is a part of the image data in the visual field area of the imaging device,
   wherein at least one of the multiple visual field subareas are sequentially scanned by a directional beam, or multiple directional beams are controlled to scan the multiple visual field subareas simultaneously.

2. The method of claim 1, wherein the obtaining the first attribute information comprises:
   scanning the visual field subarea by using a directional beam; and
   receiving the first attribute information fed back by the object in the visual field subarea according to the scanning using the directional beam.

3. The method of claim 2, wherein the first attribute information is received from a network device of a wireless network.

4. The method of claim 3, wherein the network device of the wireless network comprises:
   a radio frequency identification (RFID) device of an RFID network.

5. The method of claim 3, wherein the network device of the wireless network comprises at least one of a Wi-Fi network device, a Bluetooth network device, a Zigbee network device, a WiBro network device or a cellular network device.

6. The method of claim 1, further comprising:
   determining the visual field area according to a visual field parameter of the imaging device.

7. The method of claim 6, wherein the visual field parameter comprises:
   a focal length or a visual angle.

8. The method of claim 1, further comprising:
   storing the correspondence between the first attribute information of the object and the image data corresponding to the visual field subarea.

9. The method of claim 1, further comprising:
   displaying, corresponding to the visual field subarea, the first attribute information of the object in the visual field subarea.

10. The method of claim 1, further comprising:
    obtaining second attribute information of the object in the visual field subarea according to the first attribute information.

11. The method of claim 10, further comprising:
    displaying, corresponding to the visual field subarea, the second attribute information of the object in the visual field subarea.

12. A device, comprising:
    a processor, coupled to a memory, that executes or facilitates execution of executable modules, comprising:
        an image data obtaining module configured to obtain image data in a visual field area of an imaging device;
        a visual field area dividing module configured to divide the visual field area into multiple visual field subareas, wherein each of the multiple visual field subareas is cone-shaped;
        a first attribute information obtaining module configured to obtain first attribute information of an object in any one of the multiple visual field subareas using beam scanning; and a correspondence establishing module configured to establish a correspondence between the first attribute information of the object in the any one of the multiple visual field subareas and image data corresponding to a visual field subarea of the multiple visual field subareas in which the object is located, wherein the image data corresponding to the visual field subarea is a part of the image data in the visual field area of the imaging device, wherein at least one of the multiple visual field subareas are sequentially scanned by a directional beam, or multiple directional beams are controlled to scan the multiple visual field subareas simultaneously.

13. The device of claim 12, wherein the first attribute information obtaining module comprises:

a scanning unit configured to scan the visual field subarea by using a directional beam; and a receiving unit configured to receive the first attribute information fed back by the object in the visual field subarea according to the scan using the directional beam.

14. The device of claim 13, wherein the scanning unit comprises:

a transmitting antenna subunit configured to form the directional beam; and a control subunit configured to control the directional beam to scan the visual field subarea.

15. The device of claim 14, wherein the transmitting antenna subunit comprises at least one of a switched-beam antenna, a phased-array antenna or a smart antenna.

16. The device of claim 13, wherein the receiving unit is configured to receive the first attribute information fed back by the object in the visual field subarea according to the scan using the directional beam via a network device of a wireless network.

17. The device of claim 12, wherein the first attribute information obtaining module comprises a radio frequency identification RFID reader.

18. The device of claim 12, wherein the executable modules further comprise:

a visual field area determining module configured to determine the visual field area according to a visual field parameter of the imaging device.

19. The device of claim 12, wherein the executable modules further comprise:

a storage module configured to store the correspondence between the first attribute information of the object in the any one of the multiple visual field subareas and the image data corresponding to the visual field subarea.

20. The device of claim 12, wherein the executable modules further comprise:

a display module configured to display, corresponding to the visual field subarea, the first attribute information of the object in the any one of the multiple visual field subareas.

21. The device of claim 12, wherein the executable modules further comprise:

a second attribute information obtaining module configured to obtain second attribute information of the object in the any one of the multiple visual field subareas according to the first attribute information.

22. The device of claim 21, wherein the executable modules further comprise:

a display module configured to display, corresponding to the visual field subarea, the second attribute information of the object in the any one of the multiple visual field subareas.

23. A computer readable storage device, comprising at least one executable instruction, which, in response to execution, causes a device comprising a processor to perform operations, comprising:

obtaining image data in a visual field area of an imaging device;

dividing the visual field area into multiple visual field subareas, wherein each of the multiple visual field subareas is cone-shaped;

obtaining first attribute information of an object in another visual field area of the multiple visual field subareas by beam scanning; and establishing a correspondence between the first attribute information of the object in the other visual field subarea and image data corresponding to a visual field subarea of the multiple visual field subareas in which the object is located, wherein the image data corresponding to the visual field subarea is a part of the image data in the visual field area of the imaging device, wherein at least one of the multiple visual field subareas are sequentially scanned by a directional beam, or multiple directional beams are controlled to scan the multiple visual field subareas simultaneously.

24. A device, comprising a processor and a memory, the memory storing executable instructions, the processor being connected to the memory through a communication bus, and when the association device operates, the processor executing the executable instructions stored in the memory, so that the device executes operations, comprising:

obtaining image data in a visual field area of an imaging device;

dividing the visual field area into multiple visual field subareas, wherein each of the multiple visual field subareas is cone-shaped;

obtaining first attribute information of an object in any one of the multiple visual field subareas by means of beam scanning; and establishing a correspondence between the first attribute information of the object in the any one of the multiple visual field subareas and image data corresponding to a visual field subarea of the multiple visual field subareas in which the object is located, wherein the image data corresponding to the visual field subarea is a part of the image data in the visual field area of the imaging device, wherein at least one of the multiple visual field subareas are sequentially scanned by a directional beam, or multiple directional beams are controlled to scan the multiple visual field subareas simultaneously.

* * * * *